Feb. 14, 1967 J. J. MULQUIN 3,304,031
CATAPULT DELAYED RELEASE ELEMENT
Filed April 30, 1965 2 Sheets-Sheet 1

INVENTOR
JAMES J. MULQUIN

BY *Claude Funkhouser*
ATTORNEY

United States Patent Office 3,304,031
Patented Feb. 14, 1967

3,304,031
CATAPULT DELAYED RELEASE ELEMENT
James J. Mulquin, Rockville, Md., assignor to the United States of America as represented by the Secretary of the Navy
Filed Apr. 30, 1965, Ser. No. 452,410
7 Claims. (Cl. 244—63)

The invention described herein may be manufactured and used by or for the Government of the United States of America for governmental purposes without the payment of any royalties thereon or therefor.

This invention relates generally to tension bars and more particularly to a delayed release tension bar for a deck holdback assembly which holds an aircraft in ready position on a launching catapult until sufficient force is applied to rupture the tension bar thereby allowing the aircraft to be launched.

In the field of aircraft launching systems, insurance of safe and reliable launches is the primary concern. It is imperative, therefore, that adequate launching power be built up to insure that once an aircraft is committed to motion, it will be able to become airborne. A power build up such as this is generally achieved by restraining the aircraft from motion until the combined launching forces of both aircraft power and catapult power are imposed. This required restraint has been generally accomplished through the use of a rupturable and other types of holdback means which are designed to withstand tensile forces up to an accurately predictable amount greater than either the forces of the engine or catapult taken alone, but which will rupture upon the imposition of a combination of these forces. Various devices including rings, bars and complex mechanical linkages have been used as restraining means and although adequate, have not been entirely satisfactory in that each accomplishes a substantially instantaneous release of the aircraft.

Over the years, instantaneous release by the restraining element has been cause of problems of major import. Shock loading incidental to instantaneous release has been such as to cause structural fatigue and early overhaul requirements for aircraft, deck fittings and launching equipment such as bridles or tow elements, pendants and holdback cables. The most significant problem, however, has been that the whiplash effect of instantaneous release gives rise to a high incidence of premature shedding of the aircraft tow element with a resulting high probability of loss of aircraft and possibly the pilot.

Designers of holdback devices have been unsuccessful in their attempts to solve the aforementioned problems. The strict requirement for unerring predictability as to the rupture point of restraining elements has required the use of materials which exhibit little span between their yield and ultimate stresspoints. Previously attempted variations in restraining element configuration have proved unsuccessful in solving the problem.

It is an object of the present invention, therefore, to provide a tension bar for the holdback assembly of an aircraft launching system, which tension bar is of simple construction, inexpensive and easy to use, yet easily produced to the tolerances required to accurately predict bar rupture point.

A further object of this invention is to provide a holdback tension bar which reduces the shock loading stresses incidental to launching aircraft.

Another object of the instant invention is the provision of a holdback tension bar in which bar rupture can be delayed for a predetermined amount of time after the application of rupture force, thus reducing peak launch shock force.

According to the present invention, the foregoing and other objects are attained by providing a tension bar element with an off-set effective load axis which straightens on application of tension, whereby initial shock loading to an aircraft launching system is reduced through a controlled energy absorbing elongation incidental to the load axis straightening.

Other objects, advantages and novel features of the invention will become apparent from the following detailed description of the invention when considered in conjunction with the accompanying drawings wherein.

Figure 1:
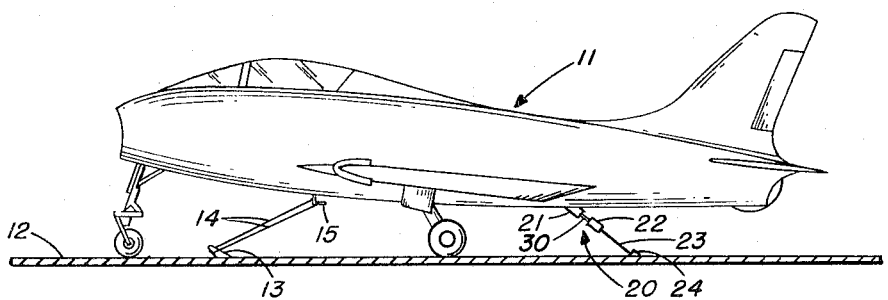
FIG. 1 is a side elevational view of an aircraft in pre-launch configuration illustrating an embodiment of the present invention in use in the holdback assembly.

Referring now in greater detail to the drawings wherein similar reference numerals refer to similar parts, there is shown in FIG. 1 an aircraft 11 ready for launch from the flight deck 12 of an aircraft carrier. Launching force is transmitted from a catapult to the aircraft through a catapult shuttle 13, launching bridle 14 and catapult tow hooks 15. The aircraft is restrained from launch until the required launching force is achieved, by a holdback assembly 20 which includes an aircraft tension bar fitting 21, tension bar 30, holdback tension bar terminal 22, holdback cable 23 and deck cleat 24.

Figure 2:
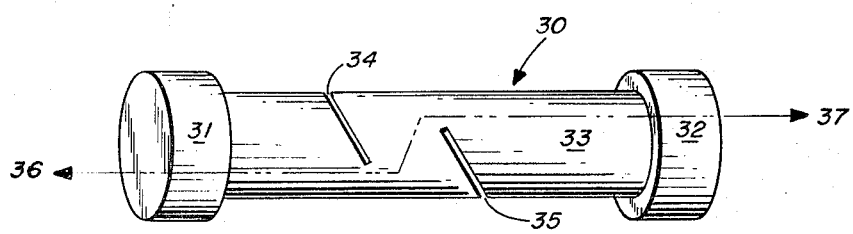
FIG. 2 is a perspective view of an embodiment of the present invention before use.
Figure 3:
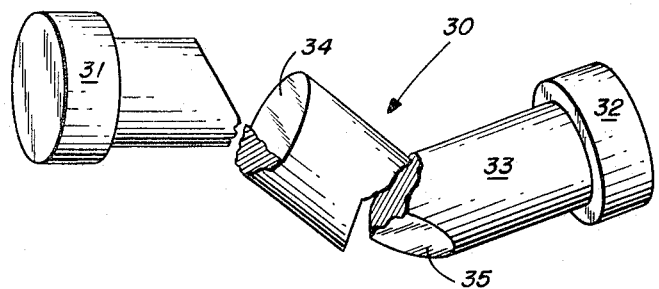
FIG. 3 is a perspective view of the device of FIG. 2 in a ruptured condition after use.

Referring now to FIG. 2, there is shown a preferred embodiment of a tension bar according to the present invention. The tension bar 30 is a one piece structure manufactured of steel, aluminum, alloys, or other similar ductile materials, and having a first enlarged end portion 31 for attaching the tension bar to the aircraft tension bar fitting 21. The bar also has a second enlarged portion 32 on the end opposite said first enlarged portion 31 for attaching the tension bar to the holdback tension bar terminal 22, and a cylindrical shank portion 33 between the enlarged portions. The shank portion is provided with inwardly extending notches 34 and 35 formed by saw cutting or other suitable methods, said notches being disposed on diametrically opposite surfaces of the cylindrical shank 33. The notches are of a depth greater than half the diameter of shank 33, thereby to define an off-set effective load axis 36, 37. Thus, when a tensile force in excess of a predetermined magnitude, such as a launching force, is applied to the bar via end portions 31 and 32, a force couple is set up by reason of the off-set load axis which tends to straighten the load axis thus elongating the bar prior to rupture. The energy utilized in thus deforming the bar to a configuration after failure such as that shown in FIG. 3, does not reach the aircraft. Without the use of the present invention, that energy would be transmitted directly to the aircraft and would contribute to the shock loading which causes peak stresses in overcoming the at-rest inertia of the aircraft being launched. With the present invention, however, the peak load is lessened by the amount of energy absorbed in deforming the bar and a safer, smoother launch is achieved. By varying the depth of the notches and degree of off-set, the amount of elongation can be controlled and therewith, the amount of energy absorbed.

Figure 4:
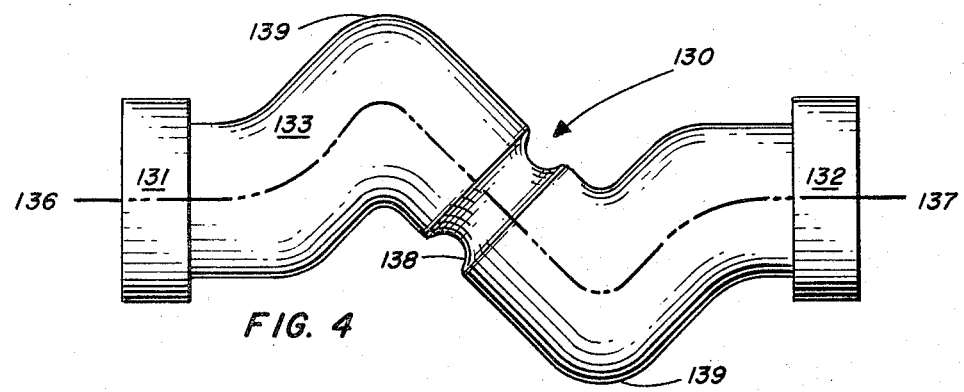
FIGS. 4 through 7, inclusive, illustrate several alternative embodiments of the invention.

FIG. 4 illustrates a second embodiment of the invention having end connecting portions 131, 132 for attaching the tension bar to an aircraft tension bar fitting and holdback tension bar terminal, respectively, and a substantially Z-shaped shank portion 133 of cylindrical cross-section. A reduced diameter portion 138 is formed in shank 133 substantially equidistant from the end connecting portions. The substantially Z-shaped configuration of the shank 133 defines an off-set effective load axis 136, 137.

When launching force is applied to the system, the bar will elongate until the effective load axis is substantially straightened. Ultimately, at a predetermined force level, the bar will rupture at the reduced diameter portion 138.

Figure 5:
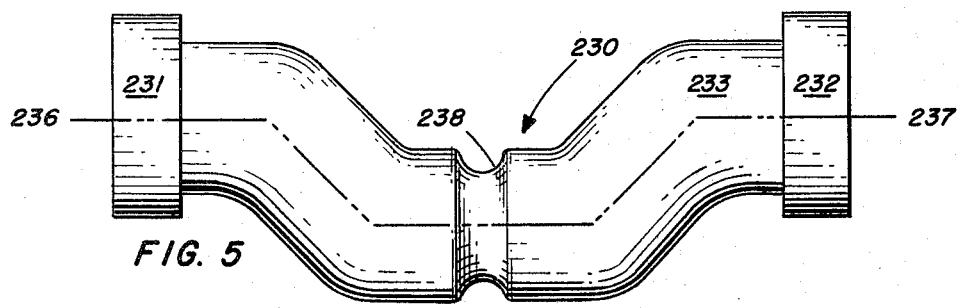

FIG. 5 illustrates an embodiment of the present invention similar to that shown in FIG. 4, but wherein the off-set load axis 236, 237 is defined by a U-shaped shank portion instead of the Z-shaped shank portion of the embodiment of FIG. 4.

Figure 6:
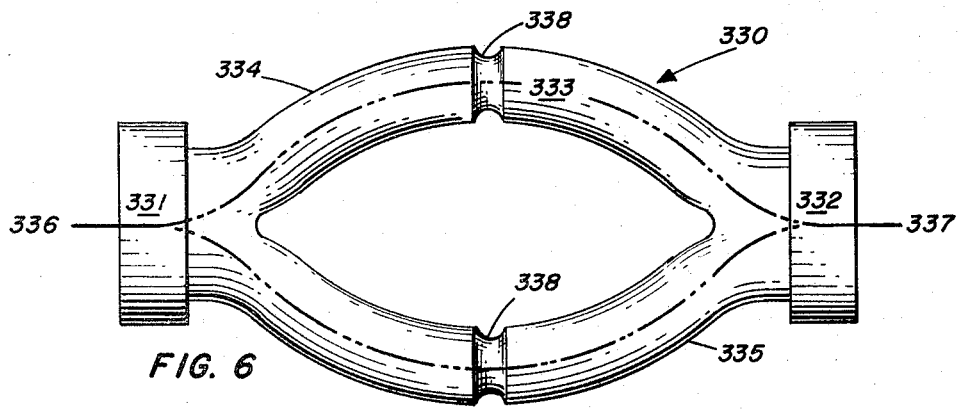

FIG. 6 illustrates another embodiment of the present invention having first and second connecting portions 331 and 332 and a substantially split shank portion 333 defining an off-set load axis 336, 337, and having an upper shank element 34 and lower shank element 335. Each of the shank elements have notches 338 centrally disposed therein. Thus, when launching force is applied to the system, the upper and lower shank elements 334, 335 will tend to straighten until adequate tensile force is imposed to fracture the bar at notched section 338.

Figure 7:
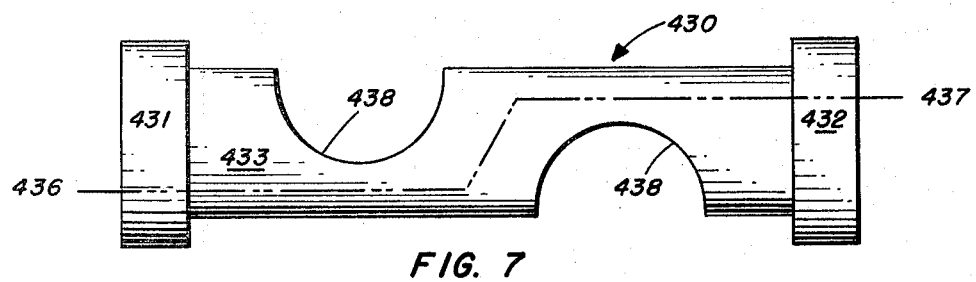

FIG. 7 illustrates a still further embodiment of the invention which is similar to that of FIG. 2 but wherein the notches 438 in shank portion 433 are substantially U-shaped indentations. The depth of U-shaped indentations 438 is greater than half the width of the bar so as to define an off-set effective load axis 436, 437. When launching force is applied to the system, the bar will elongate until said effective load axis is substantially straightened. By varying the depth of the U-shaped indentations, the degree of off-set can be varied thereby affording a method of controlling allowable elongation with respect to rupture.

Obviously many modifications and variations of the present invention are possible in the light of the above teachings. It is therefore to be understood that within the scope of the appended claims the invention may be practiced otherwise than as specifically described.

What is claimed is:
1. A frangible tension bar comprising:
a first connecting portion;
a second connecting portion;
a shank portion extending axially between said first and second connecting portions; and
at least two axially displaced notches in substantially opposite surfaces of said shank, said notches extending radially into said shank to a depth greater than half the shank thickness to define an offset load axis whereby the application of a tensile load to the bar creates a couple tending to straighten said effective load axis and elongate said tension bar, prior to failure.

2. A frangible tension bar comprising:
a first connecting portion;
a second connecting portion; and
a substantially Z-shaped shank portion between said first and second connecting portions, the axis of said Z-shaped shank portion defining an offset effective load axis whereby the application of a tensile load to the bar creates a couple tending to straighten said effective load axis and elongate said tension bar, said shank portion being provided with a reduced cross-sectional area portion substantially at its longitudinal center whereby to define the point at which bar rupture will occur.

3. A frangible tension bar comprising:
a first connecting portion;
a second connecting portion; and
a substantially U-shaped shank portion between said first and second connecting portions, the axis of said U-shaped shank portion defining an offset effective load axis whereby the application of a tensile load to the bar creates a couple tending to straighten said effective load axis and elongate said tension bar, said shank portion being provided with a reduced cross-sectional area portion substantially at its longitudinal center whereby to define the point at which bar rupture will occur.

4. A frangible tension bar comprising:
a first connecting portion;
a second connecting portion; and
a shank portion comprising a split element having upper and lower curvilinear portions, the axes of said upper and lower curvilinear portions defining an offset effective load axis whereby the application of a tensile load to the bar creates force components tending to straighten said effective load axis and elongate said tension bar, said shank portion being provided with a reduced cross-sectional area portion substantially at its longitudinal center whereby to define the point at which bar rupture will occur.

5. A frangible tension bar of ductile material for use with the holdback rigging of a catapult means for launching aircraft, comprising:
a first connecting portion for attachment to the aircraft;
a second connecting portion for attachment to the holdback rigging; and
an elongated cylindrical portion extending between said first and second connecting portions, said elongated portion having at least two slits extending substantially radially at least halfway therethrough, said slits being longitudinally displaced and disposed alternately on opposite surfaces of said elongated portion and defining a Z-shaped tensile load axis whereby application of tensile forces tends to straighten said load axis so as to elongate said tension bar prior to failure.

6. The tension bar of claim 1 wherein the notches are narrow slits.

7. The tension bar of claim 1 wherein the notches are substantially U-shaped.

References Cited by the Examiner

UNITED STATES PATENTS

| | | | |
|---|---|---|---|
| 3,185,413 | 5/1965 | Walker | 244—63 |
| 3,198,288 | 8/1965 | Presunka | 188—1 |
| 3,240,057 | 3/1966 | Ormond | 73—141 |

FOREIGN PATENTS

| | | |
|---|---|---|
| 177,997 | 1/1962 | Sweden. |
| 673,844 | 11/1963 | Canada. |

MILTON BUCHLER, *Primary Examiner.*

L. C. HALL, B. BELKIN, *Assistant Examiners.*